United States Patent
Tanaka et al.

(10) Patent No.: US 6,614,746 B1
(45) Date of Patent: Sep. 2, 2003

(54) OPTICAL RECORDING/REPRODUCING METHOD, RECORDING MEDIUM USED FOR OPTICAL RECORDING AND REPRODUCTION, AND OPTICAL RECORDING/REPRODUCING APPARATUS

(75) Inventors: Keiichi Tanaka, Chiba (JP); Yasuyuki Mitsuoka, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/486,690

(22) PCT Filed: Jul. 6, 1999

(86) PCT No.: PCT/JP99/03637

§ 371 (c)(1),
(2), (4) Date: Jun. 7, 2000

(87) PCT Pub. No.: WO00/02194

PCT Pub. Date: Jan. 13, 2000

(30) Foreign Application Priority Data

Jul. 7, 1998 (JP) .......................................... 10-191858

(51) Int. Cl.[7] ............................................... G11B 7/00
(52) U.S. Cl. ................... 369/126; 369/288; 369/112.27
(58) Field of Search .......................... 369/275.1, 275.2, 369/284, 288, 44.26, 13.33, 103, 106, 112.27, 112.01, 112.09, 112.14, 112.21, 112.23

(56) References Cited

U.S. PATENT DOCUMENTS

| | | | | | |
|---|---|---|---|---|---|
| 5,182,669 | A | * | 1/1993 | Chikuma et al. | 369/288 |
| 6,094,413 | A | * | 7/2000 | Guerra | 369/275.4 |
| 6,115,344 | A | * | 9/2000 | Gudesen et al. | 369/284 |
| 6,291,132 | B1 | * | 9/2001 | Glushko et al. | 369/275.3 |

FOREIGN PATENT DOCUMENTS

| JP | 10039099 A | * | 2/1998 |
|---|---|---|---|
| JP | 11242815 A | * | 9/1999 |

* cited by examiner

*Primary Examiner*—Thang V. Tran
(74) *Attorney, Agent, or Firm*—Adams & Wilks (57) ABSTRACT

High density data storage device has a support substrate and one or more different types of phosphors contained at each of plural regularly arranged microscopic regions of the support substrate. Each of the different types of phosphors has a fluorescence characteristic that may be faded by incident light having a different predetermined wavelength. The use of near-field light facilitates a reduction in size of the space required for each data bit. By providing a plurality of different types of phosphors at each of the microscopic regions, the amount of information storable at each bit space is rendered multi-valued to enable higher density recording.

38 Claims, 4 Drawing Sheets

OPTICAL RECORDING/REPRODUCING METHOD, RECORDING MEDIUM USED FOR OPTICAL RECORDING AND REPRODUCTION, AND OPTICAL RECORDING/REPRODUCING APPARATUS

CROSS-REFERENCE TO RELATED PCT APPLICATION

This application is a U.S. National stage application of copending International Application Ser. No. PCT/JP99/03637, filed on Jul. 6, 1999 claiming a priority date of Jul. 7, 1998, and published in a non-English language.

TECHNICAL FIELD

This invention relates to high density optical memories and, more particularly, to an optical recording/reproducing method utilizing near-field light and recording medium fluorescent light, an optical recording/reproducing recording medium and an optical recording/reproducing apparatus.

BACKGROUND OF THE INVENTION

In recent years, in order to make [the] optical memories with higher density, there has been a shift in recording/reproducing methods from compact disks (CD) to digital video disks (DVD). For example, the CD in its surface is recorded with pits as concave/convex structures having a size of nearly a wavelength of laser light to be used upon reproducing and a depth of approximately a quarter of the wavelength. For reproducing the information, interference of light is utilized, When a laser light spot is illuminated to the pit, because the pit depth is almost a quarter wavelength, the difference in optical path between the reflection light reflected upon a pit bottom and the reflection light on a surface outside the pit is given a half of the wavelength of the illuminated laser light. Thus, the reflection light available is weak as compared to the case of illuminating a laser light spot to the surface outside the pit. In this manner, the presence or absence of a pit is determined by detecting an intensity of reflection light, thus reproducing information recorded on the CD. Although DVD recording/reproducing is conducted by illuminating a laser light spot to a recording medium, the pit size can be made smaller than the CD by shortening a laser wavelength to be used thus enabling higher density recording/reproducing.

Meanwhile, there is known a near-field optical microscope for observing a microscopic surface texture of a sample by using a probe having a microscopic aperture with a diameter of an illumination light wavelength or smaller, e.g. approximately 1/10th of the wavelength, and through utilizing a near field (evanescent field). In this near-field optical microscope, the probe microscopic aperture and the sample surface are approached in distance to nearly the diameter of the probe microscopic aperture so that a near field caused on the sample surface due to illumination of propagation light from a sample backside is detected by the probe. In this case, the near field caused on the sample surface involves an intensity and phase reflecting a sample surface microscopic texture. This near field is scattered through the probe microscopic aperture and extracted as propagation light, and received by a photodetector, thereby achieving a resolution unrealized in the conventional optical microscope.

Consequently, the utilization of the near-field optical microscope technology as stated above makes possible recording/reproducing exceeding the recording density on the conventional information recording medium such as a CD or a DVD.

For high density recording/reproducing, there is a reduction of bit size and multi-valued bit information. It is possible for the DVD to conduct recording/reproducing with higher density than the CD by shortening the illumination light wavelength and thereby reducing the bit size. However, because of using means to reduce a spot diameter through a lens, the illumination light spot diameter onto the recording medium cannot be reduced to a half of the wavelength or smaller due to a light diffraction limit. Due to this, if the bit size becomes a half wavelength of illumination light or smaller, it is impossible for the conventional optical system to record/reproduce information. Consequently, for recording/reproducing with higher density than the DVD, there is a need for shortening a wavelength to be used. Also, the CD and DVD obtain information only of 0, 1 from each bit without being multi-valued.

Meanwhile, if utilizing a near field that can reduce the spot diameter to a half of an illumination wavelength or smaller exceeding the light diffraction limit, high density recording/reproducing is feasible due to reducing the bit size. However, there has been no proposal to render the information from each bit multi-valued in order to provide higher density. Therefore, it is an object of the present invention to reduce the bit size by using a near field and at the same-time to provide a scheme for recording/reproducing multi-valued information for each bit, in order to realize high density recording/reproducing. Also, another object is to obtain a recording medium and apparatus for recording/reproducing.

DISCLOSURE OF THE INVENTION

In order to achieve the above objects, an optical recording method according to the present invention illuminates a near-field light onto a recording medium having at least one or more types of phosphors, to fade fluorescence of a particular phosphor in a microscopic region on the recording medium. The use of near-field light can reduce the size of one recording bit as compared to the conventional optical system using a lens. Also, although the conventional method was recording of binary values of 0, 1 for one recording bit, among a plurality of kinds of phosphors, fluorescence of a particular phosphor only fades to record the presence or absence of fluorescence, rendering the information amount on one recording bit multi-valued. From these, higher density recording than the conventional method is feasible.

Also, in an optical recording method according to the invention a near-field light having a corresponding wavelength to a particular phosphor is illuminated onto a recording medium having at least one or more types of phosphors, to fade fluorescence of the particular phosphor in a microscopic region on the recording medium. The use of near-field light can reduce the size of one recording bit as compared to the conventional optical system using a lens. Where fading fluorescence of one kind of a particular phosphor, the fluorescence is faded by illuminating a light having a corresponding wavelength onto this phosphor. At this time, fluorescence of other phosphors does not fade. Also, where fading fluorescence of a plurality of kinds of phosphors, a corresponding wavelength of light to each phosphor is illuminated separately or simultaneously, thereby fading fluorescence of them. At this time, fluorescence of the phosphor not corresponding to the wavelength dose not fade. In this manner, arbitrary phosphors are changed in fluorescence whereby recording to one bit can be rendered multi-valued. From this, higher density recording than the conventional method is feasible.

Also, in an optical recording method according to the invention a near-field light is illuminated onto a recording medium having at least one or more types of phosphors and the near-field light is changed in light amount, to fade fluorescence of the particular phosphor in a microscopic region on the recording medium. The use of near-field light can reduce the size of one recording bit as compared to the conventional optical system using a lens.

Also, fluorescence is faded in the order of fluorescence readier to be photooxidized due to an illumination amount of near field light among a plurality of kinds of phosphors contained in a thin film, whereby the information amount of one recording bit can be rendered multi-valued. Also, where two kinds of phosphors are the same in light wavelength for fading fluorescence, it is impossible to vary the wavelength to fade fluorescence of either one of them. However, because the method of changing the illumination amount is not dependent upon the wavelength, one of the phosphors can be faded in fluorescence even where using phosphors the same in light wavelength to fade fluorescence. From these, higher density recording is feasible than in the conventional.

Also, in an optical reproducing method according to the invention a near-field light is illuminated onto a recording medium having at least one or more types of phosphors and recorded with data microscopically by the presence or absence of fluorescence on a particular one of the phosphors, to specify a fluorescent one of the phosphors from a spectrum obtained. By detecting from a spectrum the presence or absence of fluorescence on each phosphor contained in a recorded bit, it becomes feasible to reproduce multi-valued information recorded on a microscopic bit.

Also, in a recording medium according to the invention a thin film containing at least one or more types of phosphors is formed on a substrate. By doing so, a recording medium for optical recording/reproducing is obtained which is increased in density by rendering information recording/reproducing multi-valued.

Also, in a recording medium according to the invention thin films each having only one type of phosphor are formed on a substrate depending on the kind of phosphor. Because each kind of phosphor is isolated, energy transfer between different phosphors is suppressed so that fluorescent light can be obtained with efficiency. By doing so, a recording medium for optical recording/reproducing is obtained which is increased in density by rendering information recording/reproducing multi-valued.

Also, a recording medium according to the invention forms an insulation film between the thin films formed. This causes energy transfer only between the phosphors to thereby increase excitation efficiency, increasing fluorescent efficiency, obtaining intense fluorescent light and improving the S/N ratio during reproduction. By doing so, a recording medium for optical recording/reproducing [could be] obtained which is increased in density by rendering information recording/reproducing multi-valued.

Also, a recording medium according to the invention has on the substrate a metal film on a side formed with the thin films. By doing so, the excitation light illuminated to a recording medium surface transmits through each thin film, and is thereafter reflected on the metal film and again, illuminates the thin film, improving excitation efficiency and increasing fluorescent intensity. By doing so, a recording medium for optical recording/reproducing is obtained which is increased in density by rendering information recording/reproducing multi-valued.

Also, an optical recording apparatus according to the present invention comprises: a recording medium having phosphors, a head for producing a near-field light, an adjusting mechanism for adjusting a wavelength and/or a light intensity of the near-field light, and an approaching mechanism to cause the recording medium and fluorescence of the head to approach. Due to this, a near-field light can be illuminated only to a microscopic region on the recording medium, and fluorescence of the phosphors contained in the microscopic region of the recording medium can be faded in fluorescence by using a near-field light, obtaining a high density optical recording apparatus.

Also, an optical reproducing apparatus according to the invention comprises a recording medium having phosphors, a head for producing a near-field light to excite the phosphors, a mechanism for specifying a fluorescent one of the phosphors from a spectrum of the recording medium, and an approaching mechanism to cause the recording medium and the head to approach. Due to this, a high density optical reproducing apparatus is obtained which illuminates a near-field light to a recording medium having at least one kind or more of phosphors and microscopically faded in particular fluorescence of the phosphors to specify a fluorescent phosphor from an obtained spectrum.

BEST MODE FOR CARRYING OUT THE INVENTION

Hereinafter, in order to realize high density optical recording/reproducing concerning the present invention, explanations will be made based on the drawings in detail of embodiments of a recording/reproducing method capable of reducing recording bit size using near-field light and obtaining multi-valued information from each bit, and of a recording medium and an apparatus therefor. Incidentally, the invention is not limited by the embodiments.

Embodiment 1

Figure 1:
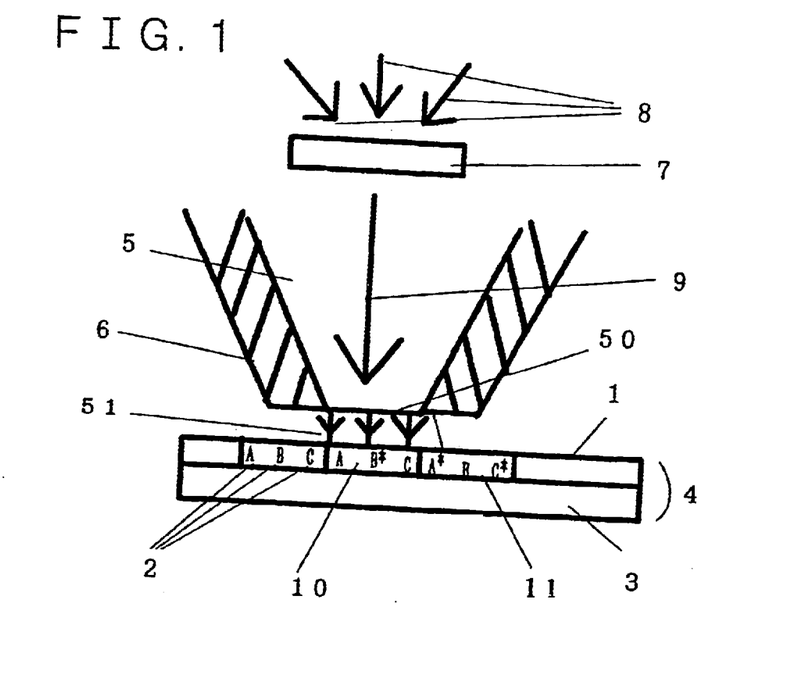
FIG. 1 is a schematic view showing a recording method according to Embodiment 1 of the present invention.

FIG. 1 is a schematic view representing a recording method by virtue of fading florescence on particular phosphors among a plurality of kinds of phosphors 2 included in a polymer recording thin film 1 (hereinafter, referred to as recording film), in a particular region of the recording film 1.

High density recording is performed on a recording medium 4 formed, on a substrate 3, with the recording film 1 having the plurality of kinds of phosphors 2 by using an optical probe 5 formed with a microscopic aperture 50 having a diameter of the wavelength of light or shorter. The optical probe 5 is coated with aluminum as a shading film 6 in areas except for the microscopic aperture 50. The optical probe 5 is provided with a wavelength select filter 7 on its light incident side so that only selected light out of the light 8 from a light source is incident on the optical probe 5.

The distance between the optical probe 5 at the microscopic aperture 50 of the optical probe 5 and the recording film 1 is controlled to be a constant value equal to or less than the wavelength of light. For example, a laser light is illuminated to the vertically-vibrating optical probe 5 to detect a change an amplitude by an optical lever method used in the atomic force microscope (AFM). The change in amplitude is read out as a distance change amount between the optical probe 5 and the recording medium 1 and the amplitude change is maintained constant whereby the distance between the optical probe 5 and the recording film 1 can be controlled to a constant value equal to or less than the wavelength of light.

As a result of this, near-field light 51 is emitted through the microscopic aperture 50 and illuminated onto the recording film 1. The size (spot size) of illumination on the recording film 1 b this near-field light 51 is nearly equal to the size of the microscopic aperture 50. That is, by using the near-field light 51, it is possible to illuminate only a microscopic region on the recording film 1.

There is a photo-bleaching method used as a method for fading fluorescence of particular phosphors. In this method, light having a corresponding wavelength to the particular phosphor is illuminated whereby the particular phosphor is photooxidized and its fluorescence fades. Photooxidation is used to illuminate light in the presence of oxygen to change a molecular structure. Hereinafter, the light selected by the wavelength select filter 7 to fade fluorescence of the phosphors 2 is referred to as fading light 9. For example, consideration is made of a case in which three kinds of phosphors A, B, C are contained in a thin film. It is assumed that the center wavelengths of fading light 9 corresponding to the phosphors A, B and C are X1, X2 and X3. In the case of fading fluorescence of the phosphor B, fading light 9 with a center wavelength X2 is incident on the optical probe 5. This fading light 9 has no effect upon fluorescence of the other phosphors A, C.

Consequently, consideration is made of a case that the near-field light 51 emitted through the microscopic aperture 50 of the optical probe 5 illuminates the recording film 1. It is assumed as a region 10 that this selected fading light 9 illuminates the recording film 1. The region 10 is equal to the size of the microscopic aperture. If fading light 9 with the center wavelength $\lambda 2$ is incident on the optical probe 5, fluorescence of the phosphor B in the region 10 fades. B* in the figure represents that the fluorescence of phosphor B is faded out. Similarly, it is possible in a region 11 to fade fluorescence on the phosphors A, C by making incident wavelengths $\lambda 1$, $\lambda 2$ of fading light 9 on the optical probe 5 separately or simultaneously. A*, C* represent that the phosphors A, C have been faded out in fluorescence. The illuminated region 11 is equal in diameter to the size of the microscopic aperture.

By the above, the use of near field light through the microscopic aperture makes it possible to reduce one recording bit size as compared to the conventional optical system using a lens, thus enabling higher density recording than the conventional methods. Also, the conventional methods have been based on recording with two values of 0, 1 with respect to one recording bit. However, only one or more particular phosphors among a plurality of different kinds of phosphors are faded in fluorescence to record on the presence or absence of fluorescence so that the information amount of one recording bit can be multi-valued to make possible higher density recording than in the conventional methods.

Embodiment 2

Figure 2:
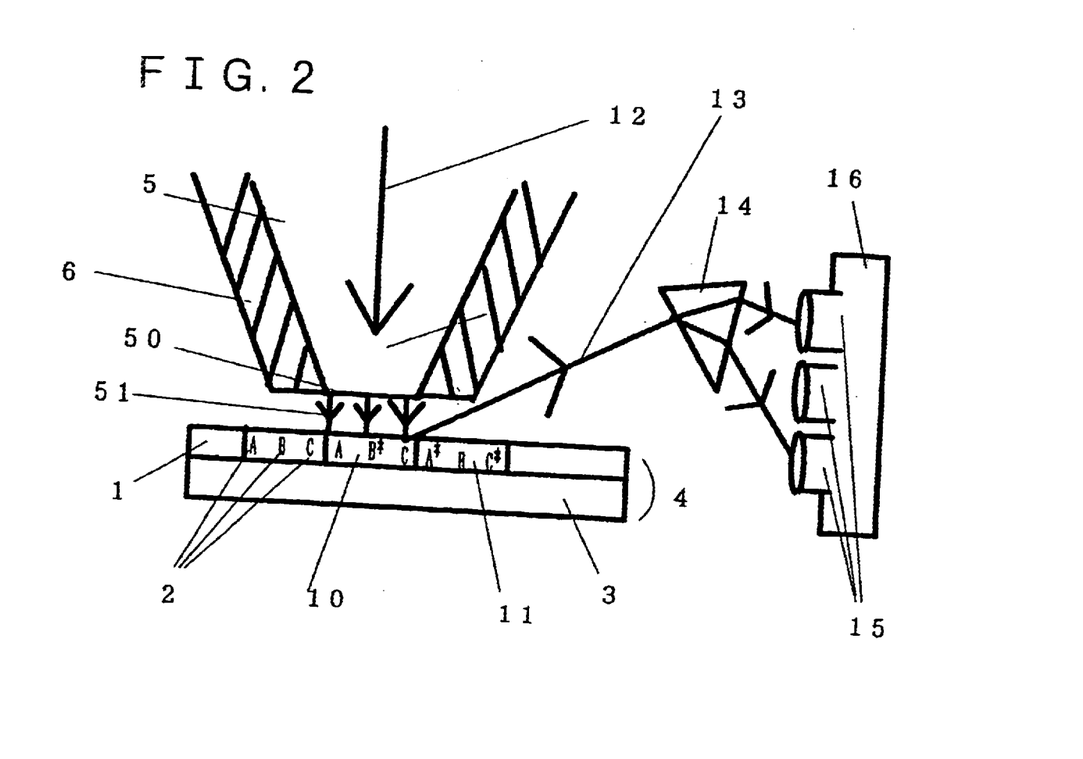
FIG. 2 is a schematic view showing a reproducing method according to Embodiment 2 of the present invention.

FIG. 2 is a figure representing a reproducing method in which excitation light is illuminated to the recording medium shown in Embodiment 1 to receive fluorescent light.

A recording film 1 in its microscopic region is recorded with information depending on the presence or absence of fluorescence on phosphors 2, as was shown in Embodiment 1. An optical probe 5 is controlled similarly to Embodiment 1. The incidence of excitation light 12 provides near-field light 51 through a microscopic aperture 50, making possible illumination only to a microscopic region on the recording film 1. A prism 14 is provided to separate, by wavelength, fluorescent light 13 from the recording film 1. The fluorescent light 13 thus separated is received by a detector array 16 having detectors 15 corresponding to wavelengths.

Consideration is made of a case in which three phosphors A, B, C exist in the recording film 1, as was shown in Embodiment 1. In a region 10 two phosphors A, C are left by the recording method of Embodiment 1. From a light source, excitation light 12 capable of exciting all the phosphors A, B, C is incident on the optical probe 5.

If near-field light 51 is illuminated to a region 10, fluorescent light 13 is obtained only from the phosphors A, C. The fluorescent light from the phosphors A, C is incident on a prism 14 to be separated on a wavelength basis. The separated fluorescent light is received by the detector array 16 having the corresponding detectors 15 to separated wavelengths. The presence or absence of light reception on each detector 15 is put in correspondence to signals 1, 0. If representing the presence or absence of signals in the order of A, B and C, the florescent light from the region 10 is given as 1, 0, 1. Similarly, if excitation light 12 is illuminated to a region 11, signals 0, 1, 0 are obtained because fluorescence is left only on the phosphor B.

From the above, where the three phosphors are contained, in the recording shown in Embodiment 1 an arbitrary phosphor can be changed in fluorescence. In the reproduction shown in the present embodiment, multi-valuing to 2 combinations is available by detecting the presence or absence of a fluorescent light spectrum on each phosphor through the corresponding detector 15. Similarly, where m kinds of phosphors are contained in the thin film, multi-valuing is possible to $2^m$ combinations.

Due to this, despite the fact that in the conventional art only two values 0, 1 have been applied to one recording bit, arbitrary phosphors 2 contained in the recording film 1 are changed in fluorescence so that the changes are detected as a wavelength spectrum of fluorescent light 13 thereby enabling multi-valuing of information amount on one recording bit. Also, the use of near-field light 51 through a microscopic aperture of an optical probe 5 can provide reproduction of information out of a microscopic region of a size equal to or less than a wavelength. As a result, reproduction is possible higher in density than in the conventional art.

Embodiment 3

Figure 3:
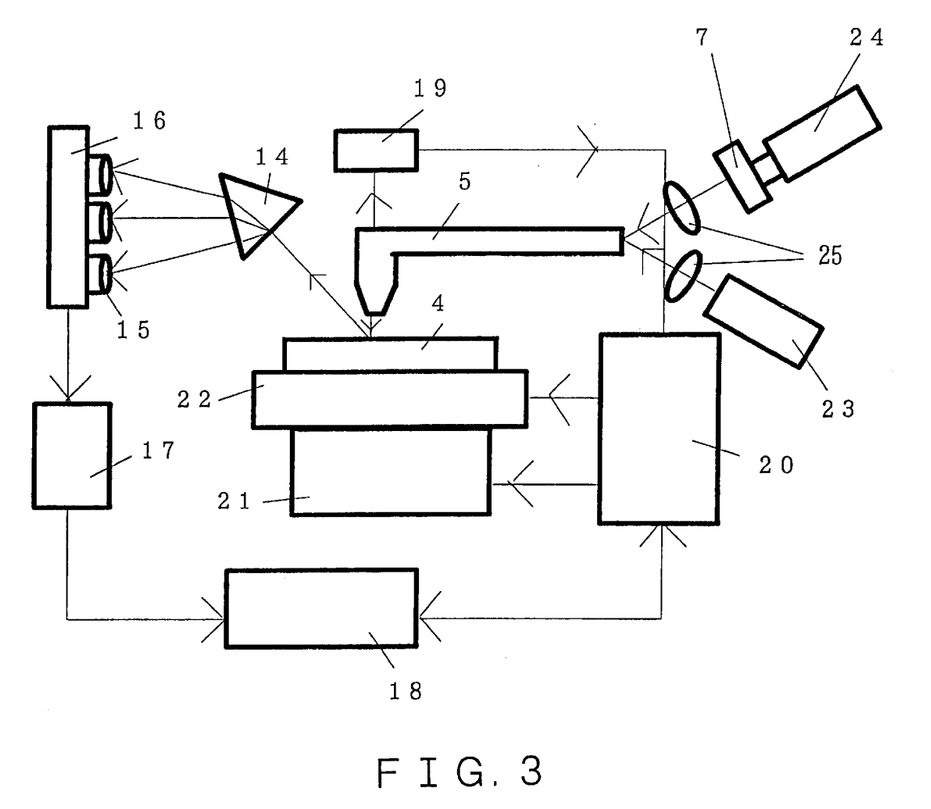
FIG. 3 is a schematic view showing an apparatus for performing recording and reproducing according to Embodiment 3 of the present invention.

FIG. 3 is a schematic structural view of an apparatus for recording and reproducing by applying a mechanism of a near field optical microscope.

The apparatus comprises a recording medium 4 for recording information, an optical probe 5 for illuminating the recording medium 4 with near–field light for recording/reproducing, a light source system 7, 23–25, a distance control system 19–22 for controlling the distance between the optical probe and recording medium, a prism 14 for separating florescent light, a detector array 16 having corresponding detectors 15 for separated wavelengths, a signal processing circuit 17 for reading as signals 0, 1 the presence or absence of light reception in each detector 15 to process information, and a computer 18 for controlling the overall apparatus.

The optical probe 5 has a structure as stated in Embodiment 1, which can be formed by sharpening a tip of an optical fiber and coating around it with aluminum except for a portion to be formed into a microscopic aperture. The size of the microscopic aperture is, for example, about 100 nm in diameter.

The distance control system for controlling the distance between the optical probe and recording medium comprises a distance measuring means 19 for measuring a distance between a tip of the optical probe S and the recording medium 4, a distance control circuit 20 for generating a feedback signal from a distance measured by the distance measuring means 19, and a rough movement mechanism 21 and fine movement mechanism 22 for changing a distance between the tip of the optical probe 5 and the recording medium 4 in response to this feedback signal. The distance measuring means 19 can use, for example, an optical lever of the type used in an AFM. The rough movement mechanism 21 can use, for example, a stepping motor and a rack-and-pinion, while the fine movement mechanism 22 can use a piezoelectric element.

Figure 4:
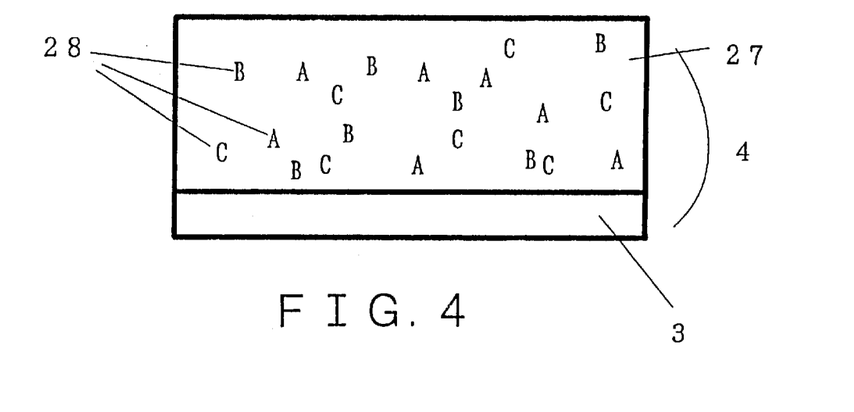
FIG. 4 is a schematic view showing a recording medium according to Embodiment 3 of the present invention.

The recording medium 4 is obtained, for example, by forming on a substrate 3 one polymer recording thin film 27 containing three kinds of phosphors 28, as shown in FIG. 4. For example, as a polymer recording thin film 27 material there are polybinylcarbazole (PVK) and poly-p-phenylen (PPV). As the phosphors 28 there are 1,1,4,4-tetraphenyl-1-3-butadiene (TPD) and coumarin 6, quinacridone, rubrene, etc. The method for applying a polymer recording thin film 27 as above includes, for example, a wet technique including a cast film technique, a spin coat technique, and a polymerization by electrolysis, etc. For example, in the case of the spin coat technique, a polymeric material and phosphors are mixed in a solvent of chloroform, xylene, etc., and applied onto a substrate 3 by a spinner, thereby obtaining a recording medium 4.

Consideration is made of a case of performing reproduction using the apparatus explained above. A recording medium 4 is placed on the fine movement mechanism 22. First, the optical probe 5 and the recording medium 4 are further apart than a distance at which an interatomic force is to act on. If the recording medium 4 is approached to the optical probe 5 by the rough movement mechanism 21, an interatomic force begins to act on between the optical probe 5 and the recording medium 4. At that time, the rough movement mechanism 21 is halted. Then, the recording medium 4 is raised or lowered by the fine movement mechanism 22, wherein the fine movement mechanism 22 is controlled so as to give a predetermined interatomic force. Because the interatomic force acts on several tens nanometers or less, the distance between the optical probe 5 and the recording medium 4 can be controlled to be fully smaller than a wavelength of a visible portion or ultraviolet portion of light and to be a constant value.

A reproducing light source 23 uses, for example, a semiconductor laser so that the light from the reproducing light source 23 is focused by a lens 25 and incident on an optical probe 5 incident end. As a result, near-field light is given off through a microscopic aperture at an optical probe 5 tip, illuminating a microscopic region on the recording medium 4. For example, the microscopic region has a size of approximately 100 nm that is almost equal to a diameter of the microscopic aperture. By the near-field light illuminated onto the recording medium 4 from the optical probe 5, the phosphors keeping in fluorescence are excited to generate fluorescent light. The fluorescent light is separated by a prism 14.

The separated fluorescent light is received by a detector array 16 having corresponding detectors 15 for the separated wavelengths. The presence or absence of light reception on each detector 15 is fed to a signal processing circuit 17 to process signals 1, 0. The processed signal is fetched by a computer 18 to reproduce information.

For recording, means to control a distance between the optical probe 5 and the recording medium 4 to be a constant value is similar to reproduction. The light from the recording light source 24 is given through the wavelength select filter 7 to the lens 25 to be focused, and incident on an incident end of the optical probe 5. By the wavelength select filter 7, only light having a corresponding wavelength to particular phosphors is incident on the optical probe 5. The recording light source 24 can use, for example, an ultraviolet ray lamp. The light incident on the optical probe 5 is emitted through an aperture at the tip of the optical probe 5 and illuminates a microscopic region on the recording medium 4, fading out fluorescence of particular phosphors. The size of the microscopic aperture is, for example, approximately 100 nm, similarly to that upon reproduction.

When recording/reproducing was performed on the recording medium 4 having the three kinds of phosphors 28 shown in FIG. 4 by the above method, $2^3$ combinations of signals could be recorded and reproduced. Also, each bit size was approximately 100 nm thus realizing a bit size of a using wavelength or smaller.

In this manner, it is possible to obtain a recording medium 4 for high density recording/reproducing by mixing a plurality kinds of phosphors 28 in one-layered polymeric recording thin film 27 and applying it onto a substrate 3. The recording medium 4 can be manufactured at low price because of manufacture by a wet method.

Meanwhile, a near-field optical microscope mechanism was applied to illuminate near-field light emitted through the microscopic aperture of the optical probe 5 tip onto this recording medium. By doing so, it is possible to illuminate only a microscopic region on the recording medium 4. Furthermore, for this microscopic region fluorescence of arbitrary phosphors were faded to thereby perform multi-value recording so that the information recorded in multi-values could be read out of fluorescent spectrums.

From the above, it is possible to obtain a recording/reproducing apparatus higher in density than the conventional apparatus by reduction in recording bit size and multi-valuing information of each recording bit.

Embodiment 4

Figure 5:
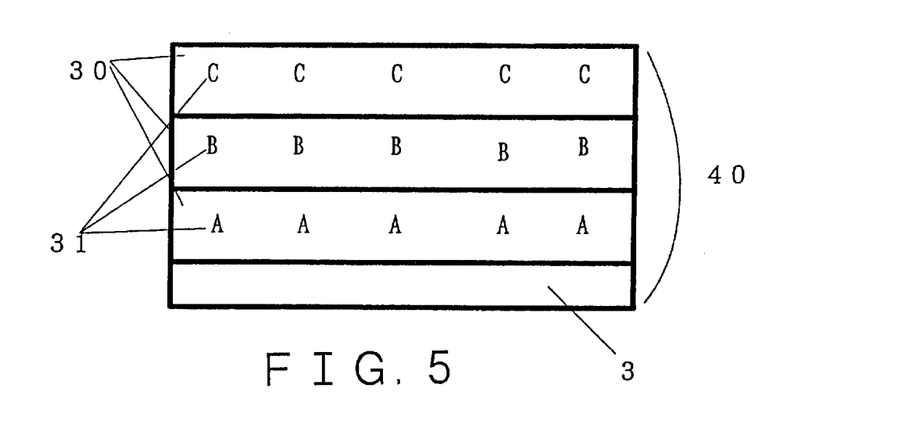
FIG. 5 is a schematic view showing a recording medium according to Embodiment 4 of the present invention.

FIG. 5 is a schematic view representing a recording medium 40 formed with polymeric recording thin films 30 in a corresponding number of layers to the kinds of phosphors 31 wherein each polymeric recording thin film 30 has only one kind of phosphor 31.

As a preparing method, a polymeric material and one kind of phosphor are mixed in a solvent and applied onto a substrate 3 using a wet technique. The solvent, polymeric material, phosphors 31, substrate 3, etc. may be those as exemplified in Embodiment 3. Due to this, one layer of polymeric recording thin film 30 is formed. A polymeric recording thin film 30 is formed thereon by using another one of phosphors 31 in a similar manner. By repeating this, a recording medium 40 comprising a plurality of phosphors can be made. It is preferred as a layering order to form a shorter wavelength one of the phosphors on a substrate side because the fluorescent light from phosphors on the substrate side is not absorbed by the phosphors layered over that.

As shown in FIG. 4, where a plurality of kinds of phosphors 28 are formed in the same polymeric thin film 27, if excitation light is illuminated, energy transfer occurs to the phosphors that are readier to be excited among the different kinds of phosphors. Energy transfer occurs when an electron excited in one molecule and a hole in a ground state turns into a dipole so that the dipole moves between adjacent molecules. In a phosphor 31 not ready to be excited, excitation energy is reduced and fluorescence intensity is lowered with a result that there may be a case wherein fluorescent intensity differ between the phosphors.

However, in the present embodiment, because the different kinds of phosphors are isolated, energy transfer is suppressed between the different kinds of phosphors. Thus, fluorescent light can be efficiently obtained from each phosphor.

From the above, by dividing the different phosphors in the separate layers, a recording medium 40 could be obtained that is suited for high density recording/reproducing with higher fluorescent efficiency than that of the recording medium 4 shown in Embodiment 3.

Embodiment 5

Figure 6:
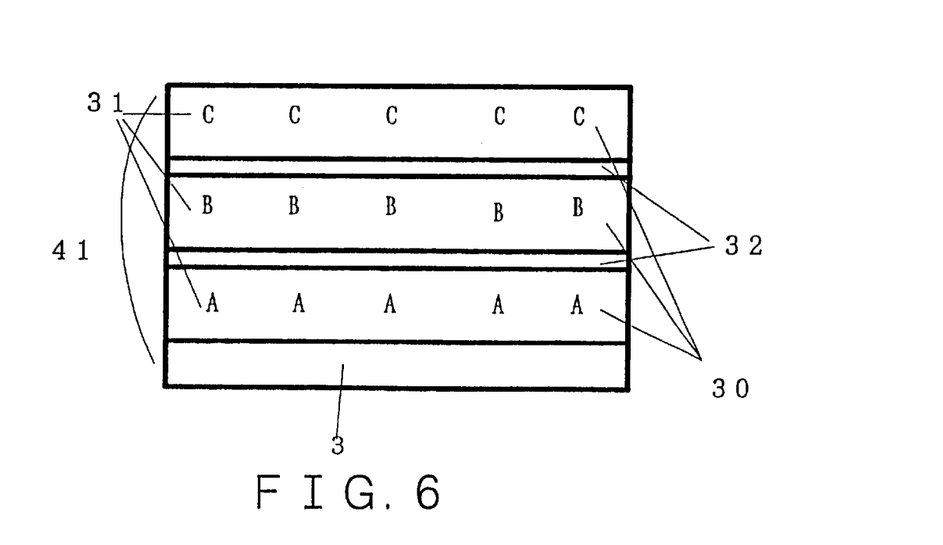
FIG. 6 is a schematic view showing a recording medium according to Embodiment 5 of the present invention.

FIG. 6 is a schematic view representing a recording medium 41 formed with inorganic insulation films 32 between the layered polymeric recording thin films 30 shown in FIG. 5. As a preparing method, a polymeric recording thin film 30 containing one kind of phosphors 31 is applied onto a substrate 3 by a wet method. Thereon, an inorganic insulation film 32 is formed. Here, the inorganic insulation film 32 is a transparent one having such a wide energy gap as not to absorb near-field light or fluorescent light. For example, when film-forming silicon nitride by sputtering, a transparent film is obtained by properly setting a gas flow rate, nitrogen ratio, etc. Furthermore, by forming layers in order using another one of phosphors in a similar way, a recording medium 41 can be manufactured.

Due to this, because the insulation film 32 has a high energy gap as compared to the phosphors 31, energy transfer occurs less in a polymeric thin film 32 interface having a different kind of phosphors 31 than in the case of Embodiment 4. That is, because energy transfer occurs only between the same kind of phosphors 31, excitation efficiency becomes high and fluorescent efficiency increases. As a result, higher intensity fluorescent light is obtained than that in Embodiment 4, and the S/N ratio upon reproduction is increased.

From the above, by forming the insulation films 32 between the polymeric thin films 30 having each of phosphors 31, a recording medium 41 suited for high density recording/reproducing could be obtained which is improved in S/N ratio as compared to the recording medium 40 of Embodiment 4.

Embodiment 6

Figure 7:
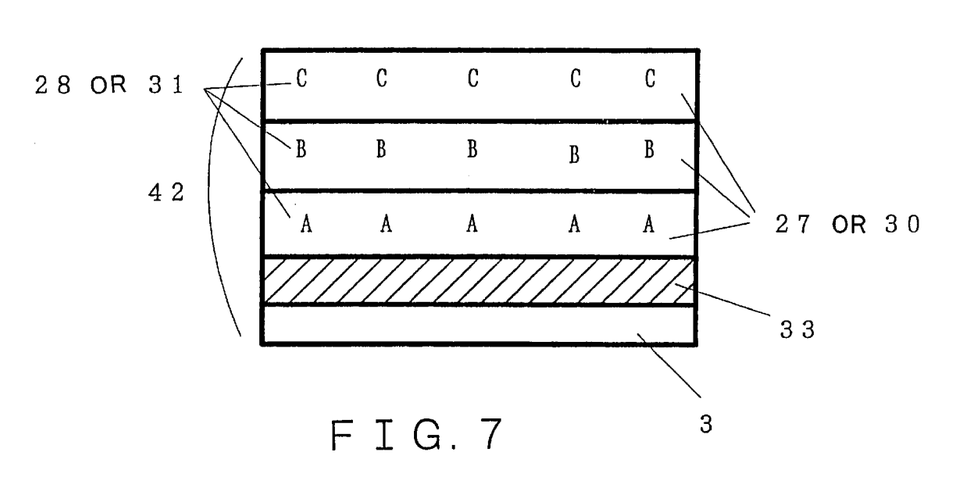
FIG. 7 is a schematic view showing a recording medium according to Embodiment 6 of the present invention.

FIG. 7 shows a schematic view representing a recording medium 4 formed with a metal film 33 between a lowermost polymeric recording thin film 27 or 30 and a substrate 3, in the recording medium 4, 40, 41 of Embodiments 3 to 5. A metal film 33 is formed on a substrate 3. As the metal film 33, there is for example aluminum or chromium. In the case of aluminum, a film is formed by sputtering or resistance-heating. Thereafter, polymeric recording thin films 27 or 30 containing phosphors 31 are formed or layered in a similar manner to the way shown in Embodiments 3 to 5.

Due to this, the excitation light illuminated on a recording medium surface transmits through each of the polymeric recording thin films 27 or 30, and then reflected upon the metal film 33 and illuminates again the polymeric thin films 27 or 30.

As a consequence, excitation efficiency is improved as compared to Embodiments 3 to 5, increasing fluorescent intensity. From the above, by forming the metal film between the lowermost polymeric recording thin film 27 or 30 and the substrate 3, it is possible to obtain a recording medium further suited for high density recording/reproducing.

Embodiment 7

Figure 8:
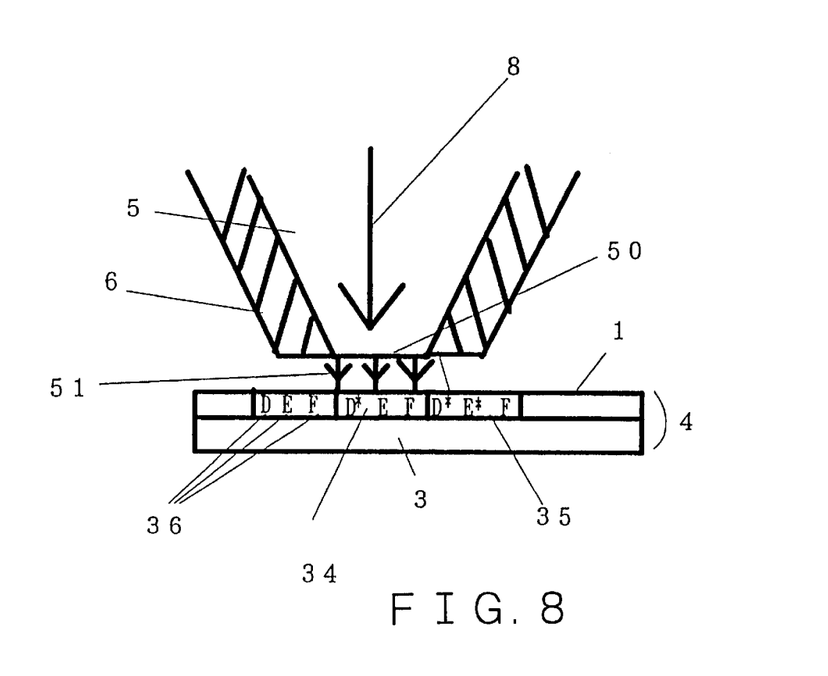
FIG. 8 is a schematic view showing a recording medium according to Embodiment 7 of the present invention.

FIG. 8 is a schematic view representing a recording method to fade fluorescence of the phosphors, at a particular region of the recording film 1, in the order readier to be photooxidized by fading light, among a plurality of phosphors contained in the recording film 1.

In order to fade fluorescence in the order of a phosphor readier to be photooxidized, varied is an illumination integrated light amount (hereinafter referred to as illumination amount) of fading light. Illumination amount is a product of illumination light intensity (hereinafter referred to as light intensity) and time. Also, the light 8 from the light source is directly given as fading light, differently from Embodiment 1.

Consideration is made of a case in which a polymeric recording film 1 contains three kinds of phosphors D, E, F. The order of a phosphor readier to be photooxidized is given D, E, F. That is, the illumination amount if increased causes photooxidation in the order of from D to F in fading fluorescence. It is assumed that D, E and F are respectively, for example, rubrene, oxadiazole derivative (PBD) and tetraphenylbutadiene (TPB). The light source for fading light 8 uses a mercury lamp. When the illumination amount is varied, fluorescence fades out in the order of rubrene, PBD and TPB.

Similarly to Embodiment 1, the microscopic aperture 50 with a size of a wavelength or smaller formed in the optical probe 5 is approached to the recording film 1 to a distance of the wavelength or shorter. The near-field light illumination region at this time is in almost the same size as the diameter of the microscopic aperture. The region illuminated by near-field light 51 is taken as a region 34. In the region 34, the illumination amount for fading fluorescence of the phosphor D is smaller than a threshold of an illumination amount for fading fluorescence of the phosphors E, F but greater than a threshold of the phosphor D. Similarly, in a region 35 the illumination amount for fading fluorescence of the phosphors D, E is smaller than a threshold of an illumination amount for fading fluorescence of the phosphor F but greater than a threshold of the phosphors D, E.

By controlling the illumination amount using near-field light 51, it is possible in the microscopic region to fade fluorescence of the three kinds of phosphors 36 in the order of a phosphor readier to be photooxidized, i.e. in the order of D, E and F. Consequently, multi-value recording for each bit is rendered feasible by the presence or absence of fluorescence on the phosphor, similarly to Embodiment 1. Note that, for the case of three kinds of phosphors, multi-valuing is possible in three combinations. Similarly, m combinations of multi-valuing is possible for m kinds of phosphors. Also, by using near-field light 51 through the microscopic aperture 50, each bit size can be made smaller than that of a case using the conventional optical system.

In Embodiment 1 the wavelength of a fading light for fading fluorescence is determined corresponding to a phosphor. If the corresponding fading light wavelengths to two different phosphors are the same, it is impossible to fade only the florescence of one phosphor. As compared to this, because the method of varying the illumination amount of the present embodiment is not dependent upon a wavelength, this point can be avoided thus making possible multi-value recording even in a case of containing in the recording film 1 the phosphors that are same in fading light wavelength.

Meanwhile, in Embodiment 1, the apparatus is complicated because of using a wavelength select filter and requires to vary the fading light wavelength in accordance with a phosphor on a recording-bit basis thus complicating the recording method. In the method of varying the illumination amount as in the present embodiment, it is satisfactory only to vary the illumination amount on the recording-bit basis without requiring a wavelength select filter. Accordingly, it is easy to realize multi-valued high density recording.

From the above, the use of a near-field light through a microscopic aperture can reduce one recording bit size as compared to the conventional optical system using a lens, enabling higher density recording than the conventional. Also, although in the conventional recording has been by binary values of 0, 1 for one recording bit, fluorescence of a plurality of kinds of phosphors contained in the thin film is faded in the order of a phosphor readier to be photooxidized due to fading light, whereby the information amount of one recording bit can be rendered multi-valued enabling higher density recording than the conventional.

INDUSTRIAL APPLICABILITY

As explained above, according to the present invention, the use of near-field light can reduce the size of one recording bit as compared to the conventional optical system using a lens, thus enabling higher density recording than the conventional system. Also, although the conventional system uses recording of binary values of 0, 1 for one recording bit, among a plurality of kinds of phosphors only one particular kind of phosphor is faded in fluorescence to record the presence or absence of fluorescence, rendering the information amount of one recording bit multi-valued and enabling higher density recording than the conventional system.

Also, according to the present invention, the use of near-field light can reduce the size of one recording bit as compared to the conventional optical system using a lens, thus enabling higher density recording than in the conventional system. Also, although the conventional method involves recording of binary values of 0, 1 for one recording bit, a near-field light having a corresponding wavelength to a particular phosphor among a plurality of kinds of phosphors is illuminated to fade fluorescence of the particular phosphor and record the presence or absence of fluorescence, thereby rendering the information amount of one recording bit multi-valued and enabling higher density recording than in the conventional method.

Also, according to the present invention, the use of near-field light can reduce the size of one recording bit as compared to the conventional optical system using a lens, thus enabling higher density recording than the conventional system. Also, when two kinds of phosphors are the same in light wavelength for fading fluorescence, it is impossible to vary the wavelength to fade fluorescence of either one of them. However, because the method of changing the illumination amount is not dependent upon the wavelength, this point can be avoided. Even where using phosphors having the same light wavelength to fade fluorescence, one phosphor can be faded in fluorescence. Also, because the method of changing the illumination amount does not require a wavelength select filter, the apparatus can be simplified and the cost can be reduced.

Also, according to the present invention, although in the conventional method the information has been binary values of 0, 1 for one recording bit, an arbitrary phosphor contained in the recording film is changed in fluorescence and the change is detected as a wavelength spectrum of the fluorescent light, enabling reproduction of multi-valued information. Also, the use of a near-field light could reproduce information from a microscopic region. As a result, information recorded with higher density then that of the conventional system is possible to reproduce.

Also, according to the present invention, a recording medium is used which is characterized by forming thin films having at least one or more types of phosphors on a substrate, thereby obtaining a recording medium for high density optical recording/reproducing. Furthermore, because the recording medium can be manufactured by a wet scheme, manufacture is possible at low price.

Also, according, to the present invention, because phosphors are isolated, energy transfer between different phosphors is suppressed. It is possible to obtain a recording medium for high density optical recording/reproducing which can obtain fluorescent light from each phosphor effectively.

Also, according to the present invention, energy transfer is caused only between the phosphors to thereby increase excitation efficiency, increasing fluorescent efficiency and obtaining intense fluorescent light. It is possible to obtain a recording medium for high density optical recording/reproducing in which the S/N ratio increases during reproduction.

Also, according to the present invention, the excitation light illuminated to a recording medium surface transmits through each thin film, and reflects on the metal film and again illuminates the thin film, improving excitation efficiency. Thus, a recording medium for high density optical recording/reproducing can be obtained in which fluorescent light intensity increases.

Also, according to the present invention, only a microscopic region of the recording medium can be illuminated by a near-field light. Using the near-field light, it is possible to fade fluorescence of the phosphors contained in the microscopic region of the recording medium, obtaining a high density optical recording apparatus.

Also, according to the present invention, a high density optical reproducing apparatus can be obtained which illuminates a near-field light to a recording medium having one or more types of phosphors and microscopically faded in particular fluorescence of the phosphors to specify a fluorescent phosphor from an obtained spectrum.

What is claimed is:

1. An optical recording method, comprising the steps of:
providing a recording medium having therein a plurality of different types of phosphors each being arranged at each of a plurality of microscopic regions, each of the different types of phosphors having a fluorescence characteristic that is altered in response to irradiation with near-field light having a predetermined wavelength so that the fluorescent characteristic of the phosphors may take on one of two different states; and
successively irradiating microscopic regions of the recording medium with a near-field light having a wavelength set to selectively alter the fluorescence characteristic of selected ones of the phosphors in the irradiated microscopic regions of the recording medium to represent a given data state in accordance with data to be stored.

2. An optical recording method according to claim 1; wherein the recording medium comprises a support substrate, and one or more thin films formed on the support substrate and containing the phosphors in regularly arranged microscopic regions.

3. An optical recording method, comprising the steps of:
providing a recording medium having therein a plurality of different types of phosphors each being arranged at each of a plurality of microscopic regions, each of the different types of phosphors having a fluorescence that is faded in response to irradiation with near-field light having a predetermined wavelength so that the fluorescence of the phosphors may take on one of two different states; and
successively irradiating microscopic regions of the recording medium with a near-field light having a wavelength set to selectively fade the fluorescence of selected ones of the phosphors in the irradiated microscopic regions of the recording medium to represent a given data state in accordance with data to be stored.

4. An optical recording method, comprising the steps of:
providing a recording medium having therein a plurality of different types of phosphors each being arranged at each of a plurality of microscopic regions, each of the different types of phosphors having a fluorescence characteristic that is altered in response to irradiation with a predetermined amount of near-field light so that the fluorescence characteristic of the phosphors may take on one of two different states; and
selectively irradiating microscopic regions of the recording medium with a near-field light of an amount effective to alter the fluorescence characteristic of selected ones of the phosphors in the irradiated microscopic regions of the recording medium to represent a given data state in accordance with data to be stored.

5. An optical recording method according to claim 4; wherein the recording medium comprises a support substrate, and one or more thin films formed on the support substrate and containing the phosphors in regularly arranged microscopic regions.

6. An optical reproducing method comprising the steps of:
providing a recording medium according to claim 5;
irradiating a microscopic region of the recording medium with a near-field light to produce reflected light having a given spectrum; and
determining a state of data stored in the irradiated microscopic region by determining fluorescent characteristics of one or more of the phosphors based on the spectrum of reflected light.

7. A recording medium comprising:
a support substrate; and
a thin film containing a plurality of different types of phosphors formed on the support substrate in each of a plurality of microscopic regions, each of the different types of phosphors having a fluorescent characteristic that is altered in response to irradiation with near-field light having one of a predetermined wavelength or intensity so that irradiation of a respective phosphor in a microscopic region with near-field light may alter the fluorescence characteristic of the respective phosphor to represent a given data state.

8. A recording medium according to claim 7; wherein the wavelength or intensity of light which alters the fluorescence characteristic of the phosphors is different for each different type of phosphor.

9. A recording medium according to claim 8; further comprising a reflective layer formed between the support substrate and the thin film so that incident light that has been transmitted through the thin film is reflected by the reflective layer and re-transmitted through the thin film to increase fluorescent intensity of the phosphors.

10. A recording medium according to claim 8; wherein the thin film comprises a polymer.

11. A recording medium according to claim 10; wherein the polymer comprises at least one of polybinylcarbazole (PVK) and poly-p-phenylen (PPV).

12. A recording medium according to claim 8; wherein the phosphors are selected from the group consisting of 1,1,4,4-tetraphenyl-1-3-butadiene (TPD), coumarin 6, quinacridone and rubrene.

13. A recording medium comprising:
a support substrate; and
a plurality of thin films each having therein only one type of phosphor formed on the support substrate, the respective thin films each having a different type of phosphor from the others, the phosphors having a fluorescent characteristic that is altered in response to irradiation with near-field light having at least one of a given wavelength and a given amount.

14. A recording medium according to claim 13; further comprising an insulation film disposed between adjacent thin films formed on the support substrate.

15. A recording medium according to claim 13; wherein each thin film contains only one of the plural types of phosphors in each of a plurality of microscopic regions, each of the plural types of different phosphors having a fluorescence characteristic that is altered in response to irradiation with near-field light having one of a predetermined wavelength and intensity, which is different for each of the different types of phosphors.

16. A recording medium according to any one of claims 7 to 14; further comprising a metal film formed on the support substrate between the support substrate and the thin films so that the metal film underlies the plural thin films.

17. An optical recording apparatus comprising:
a recording medium having therein one or more phosphors in each of a plurality of microscopic regions, the one or more phosphors each having a fluorescence characteristic that is altered in response to irradiation with near-field light having one of a predetermined wavelength or a predetermined amount so that the fluorescence characteristic of the phosphors may take on one of two different states;
a recording head for producing the near-field light to irradiate the recording medium;
an adjusting mechanism for adjusting at least one of a wavelength and an amount of the near-field light; and
an approaching mechanism to cause the recording medium and the recording head to approach one another and come into close proximity.

18. An optical reproducing apparatus, comprising:
a recording medium having therein a plurality of different types of phosphors each being arranged at each of a plurality of microscopic regions, each of the different types of phosphors having a fluorescence characteristic that is altered in response to irradiation with near-field light having one of a predetermined wavelength or a predetermined amount so that the fluorescence characteristic of the phosphors may take on one of two different states;

a reading head for irradiating the near-field light onto the recording medium to excite the phosphors to produce reflected light having a fluorescent component;

means for specifying selected fluorescent ones of the phosphors based on the fluorescent component of the reflected light; and an approaching mechanism to cause the recording medium and the recording head to approach one another and come into close proximity.

19. An optical recording medium comprising: a support substrate; a plurality of regularly arranged microscopic regions in the support substrate; and one or more different types of fluorescent materials disposed in each of the microscopic regions, each respective type of fluorescent material being responsive to light having a different predetermined wavelength to fade the fluorescence thereof so that irradiation of the fluorescent materials of selected microscopic regions with a near-field light at the predetermined wavelength fades the fluorescence of desired fluorescent materials in accordance with data to be stored such that the fluorescent characteristic of the irradiated phosphors represents the stored data.

20. An optical recording medium according to claim 19; wherein the fluorescent materials comprise phosphors.

21. An optical recording medium according to claim 19; wherein the phosphors are photooxidized by light having the corresponding predetermined wavelength so that the fluorescence thereof is faded.

22. An optical recording medium according to claim 19; wherein a plurality of the different types of fluorescent materials are arranged at each of the plurality of successive microscopic regions of the recording medium so that each microscopic region of the recording medium can be used to store a plurality of bits of data.

23. An optical recording medium according to claim 19; wherein the recording medium comprises a support substrate and one or more thin film layers containing the one or more different types of fluorescent materials formed on the support substrate.

24. An optical recording medium according to claim 23; wherein the recording medium further comprises a reflective layer disposed between the support substrate and the one or more thin film layers so that incident near-field light that has been transmitted through the one or more fluorescent materials is reflected by the reflective layer and re-transmitted through the fluorescent materials to increase fluorescent intensity.

25. An optical recording medium according to claim 23; wherein the one or more thin film layers are formed of a polymer.

26. An optical recording medium according to claim 25; wherein the polymer comprises at least one of polybinylcarbazole (PVK) and ply-p-phenylen (PPV).

27. An optical recording medium according to claim 19; wherein the recording medium comprises a support substrate and a plurality of thin films formed on the support substrate, each thin film containing a different type of fluorescent material.

28. An optical recording medium according to claim 27; wherein the recording medium further comprises an insulation film formed between the respective thin films to prevent energy transfer between the fluorescent materials contained in adjacent thin films.

29. An optical recording medium according to claim 19; wherein the one or more fluorescent materials are selected from the group consisting of 1,1,4,4-tetraphenyl-1-3-butadiene (TPD), coumarin 6, quinacridone and rubrene.

30. A method of fabricating an optical recording medium, comprising the steps of:

providing a support substrate; and forming a thin film layer on the support substrate, the thin film layer having disposed therein a plurality of different types of fluorescent materials at each of a plurality of regularly arranged microscopic regions, each type of fluorescent material having a fluorescent characteristic that is altered at a different predetermined wavelength of near-field light so that irradiation of fluorescent materials of selected microscopic regions with near-field light at a given wavelength alters the fluorescence characteristic of only one of the fluorescent materials.

31. A method of fabricating an optical recording medium according to claim 30; wherein the step of forming a thin film layer on the support substrate comprises a wet film forming technique selected from the group consisting of a cast film technique, a spin coat technique, and polymerization by electrolysis.

32. A method of fabricating an optical recording medium according to claim 31; wherein the step of forming the thin film layer on the support substrate further comprises the steps of mixing a polymer with the one or more fluorescent materials and applying one or more thin films of the mixture to the supporting substrate.

33. A method of fabricating an optical recording medium according to claim 30; wherein the step of forming the thin film layer on the support substrate comprises the steps of mixing a polymer with each of the one or more fluorescent materials to produce a mixture for each of the one or more different types of fluorescent materials, and applying a thin film of each of the mixtures to the support substrate such that each of the different types of fluorescent materials is arranged at each of the microscopic regions and each microscopic region can be used to store multi-bit data.

34. A method of fabricating an optical recording medium according to claim 33; further comprising the step of forming an insulation film between respective thin films to prevent energy transfer between fluorescent materials of different thin films.

35. A method of fabricating an optical recording medium according to claim 30; further comprising the step of forming a reflective thin film layer between the support substrate and the thin film layer so that incident near-field light that has been transmitted through the one or more fluorescent materials is reflected by the reflective thin film layer and re-transmitted through the fluorescent materials to increase fluorescent intensity.

36. A method of fabricating an optical recording medium according to claim 30; wherein the thin film layer comprises a polymer having the one or more fluorescent materials dispersed therein.

37. A method of fabricating an optical recording medium according to claim 36; wherein the polymer comprises at least one of polybinylcarbazole (PVK) and poly-p-phenylen (PPV).

38. A method of fabricating an optical recording medium according to claim 30; wherein the one or more fluorescent materials are selected from the group consisting of 1,1,4,4-tetraphenyl-1-3-butadiene (TPD), coumarin 6, quinacridone and rubrene.

* * * * *